United States Patent
Kaaresoja

(10) Patent No.: US 6,809,635 B1
(45) Date of Patent: Oct. 26, 2004

(54) MOBILE TERMINAL USING A VIBRATION MOTOR AS A LOUDSPEAKER AND METHOD OF USE THEREOF

(75) Inventor: Topi Kaaresoja, Helsinki (FI)

(73) Assignee: Nokia Corporation, Espoo (FI)

( * ) Notice: Subject to any disclaimer, the term of this patent is extended or adjusted under 35 U.S.C. 154(b) by 483 days.

(21) Appl. No.: 09/821,084

(22) Filed: Mar. 30, 2001

(51) Int. Cl.[7] .............................. H04B 3/36; H04Q 7/00
(52) U.S. Cl. .................. 340/407.1; 340/7.6; 340/388.1; 340/384.73
(58) Field of Search .............................. 340/407.1, 7.6, 340/965, 7.57, 384.1, 388.1, 384.73, 384.7; 310/81

(56) References Cited

U.S. PATENT DOCUMENTS

| 3,449,531 A | * | 6/1969 | Ashworth | 381/152 |
| 5,300,851 A | | 4/1994 | Nishikura et al. | 310/328 |
| 5,373,207 A | | 12/1994 | Yamaguchi et al. | 310/81 |
| 5,528,697 A | * | 6/1996 | Saito | 381/396 |
| 5,783,899 A | | 7/1998 | Okazaki | 310/317 |
| 5,861,797 A | | 1/1999 | Becker | 340/309.3 |
| 5,903,076 A | * | 5/1999 | Suyama | 310/81 |
| 5,960,367 A | | 9/1999 | Kita | 455/567 |
| 6,081,055 A | | 6/2000 | Narusawa | 310/81 |
| 6,211,775 B1 | * | 4/2001 | Lee et al. | 340/407.1 |
| 6,281,785 B1 | * | 8/2001 | Hamaguchi | 340/407.1 |
| 6,487,300 B1 | * | 11/2002 | Lee et al. | 381/396 |

FOREIGN PATENT DOCUMENTS

| EP | 0688125 | 12/1995 |
| EP | 1011249 | 6/2000 |
| EP | 1035633 | 9/2000 |

* cited by examiner

Primary Examiner—Donnie L. Crosland
(74) Attorney, Agent, or Firm—Antonelli, Terry, Stout & Kraus, LLP

(57) ABSTRACT

The present invention is a mobile terminal (102). The mobile terminal includes a vibration motor (108) which provides a silent vibration alert to a user of the mobile terminal during reception of incoming communications which include audio communications; and an amplifier (106, 312) the amplifier amplifying the audio communications and producing an amplified audio output coupled to at least the vibration motor which outputs the audio communications as audible sound.

22 Claims, 4 Drawing Sheets

FIG. 1
(PRIOR ART)
FIG. 2
(PRIOR ART)
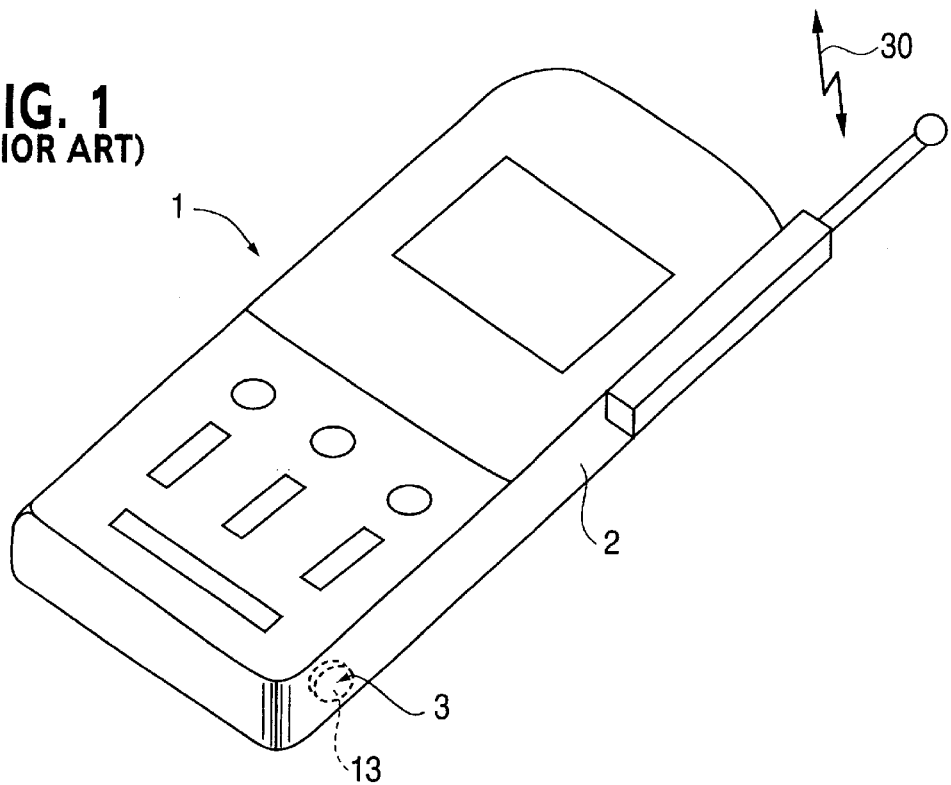
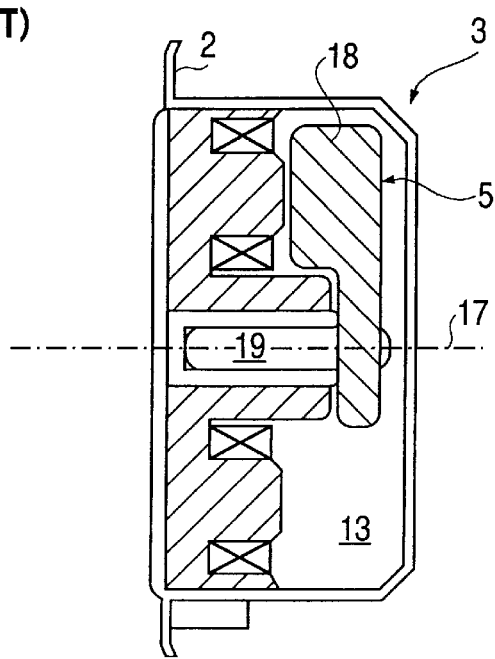

MOBILE TERMINAL USING A VIBRATION MOTOR AS A LOUDSPEAKER AND METHOD OF USE THEREOF

BACKGROUND OF THE INVENTION

1. Field of the Invention

The present invention relates to vibration motors in radio devices and, more particularly, to the use of vibration motors for performing multiple functions in radio devices.

2. Description of the Prior Art

Vibration motors are widely used in radio devices, such as mobile terminals and pagers. Vibration motors are activated upon the receipt of an incoming communication, such as a call or page, to alert the user of the radio device to receive the communication without the generation of audible sound. Vibration motors in these devices typically operate with an eccentrically driven weight, which is mounted inside of the radio device offset from the center of gravity, and typically mechanically is coupled to the case thereof to communicate vibrations produced by rotation of the eccentrically mounted rotor to the user of the radio device.

There are numerous patents pertaining to vibration motors. See U.S. Pat. Nos. 5,300,851, 5,373,207, 6,081,055, 5,783,899, 5,861,797 and 5,960,367 and European Patent Applications EP 0 688 125 A1, 1 001 249 A2 and 1 035 633 A1 which are incorporated herein by reference in their entirety.

FIG. 1 illustrates FIG. 1 of the Assignee's European Patent Application EP 1 035 633 A1. The illustrated mobile terminal 1 has a housing 2 constructed of molded plastic containing well-known components for receiving radio communications which are not part of the present invention. The mobile terminal for voice applications typically is a cellular or PCS phone at which a user receives audio communications in accordance with well-known wireless network operational principles. The mobile terminal 1 has a vibrational motor 3 contained in a housing 13. The vibrational motor 3 is used to provide the user thereof the option of receiving a signal that an incoming call or message is being received without having an audible ring.

FIG. 2 illustrates a sectional view of the housing 13 containing the vibration motor 3. A rotor 5 is attached to the shaft 19 of the vibration motor 3 which rotates around axis 17 when activated to produce vibrations to alert the user of an incoming call or message. The rotor is a disk which subtends approximately 180° or less. As a result of the rotor not being a full cylindrical disk, the center of mass of the rotor is eccentric to the rotational axis 17. The resulting imbalance when the motor 3 is activated generates vibrational forces as the rotor 5 spins which creates the physical sensation which signals the user of the mobile terminal 1 that an incoming call or message is being received.

The mobile terminal 1 also includes a loudspeaker (not illustrated) which reproduces audible sound of the caller or music, etc. The radio communications 30 which are broadcast to the terminal device are demodulated from their encoded form by a demodulator (not illustrated). The output from the demodulator is amplified to a suitable signal level to drive the loudspeaker (not illustrated) which reproduces the caller's voice, music or other sound. The foregoing operation is conventional with mobile terminal devices such as cellular and PCS phones.

The widespread consumer acceptance of mobile terminal devices, such as cellular and PCS phones, places tremendous pressures on manufacturers to cut the manufacturing cost to a minimum while providing diverse features that users have come to accept such as vibration alerts produced by the vibration motor 3 described in conjunction with FIGS. 1 and 2. Current designs of mobile terminals utilize a vibration motor solely for producing vibrations to alert the user of an incoming call or message and a loudspeaker is used for the purpose of reproducing the audible sound of the caller to the user of the terminal device, or music, etc. The use of a separate vibration motor 3 and loudspeaker adds additional cost to the cost of terminal devices 3 as a result of each of the vibration motor and loudspeaker serving only one function.

SUMMARY OF THE INVENTION

The present invention is a mobile terminal and a method of use thereof which utilizes a vibration motor for the dual purpose of providing a silent vibration alert to a user of the mobile terminal during reception of incoming communications which include audio communications and of reproducing the audio communications as audible sound. As used herein, audio communications are any sound including, but not limited to, human speech and music which is heard by a user of a mobile terminal. The use of the vibration motor to reproduce the caller's voice or other audio communications make possible the elimination of the loudspeaker conventionally found in mobile terminal devices. Furthermore, the vibration motor may be used as a woofer to accentuate low frequency components of the received audio communications while the conventional loudspeaker is used as a tweeter to reproduce higher frequency components of the received audio communications.

In its simplest form, the present invention utilizes the vibration motor, in addition to providing its conventional silent alarm function, to be the sole reproducer of audible sound contained in incoming audio communications. In additional embodiments of the invention, the vibration motor may be used for reproducing enhanced lower frequency components within the received audio communications while the conventional loudspeaker is used to produce higher frequency components in the received audio communications.

Filters may be used to selectively pass the lower and higher frequency components of the audio communications respectively to the vibration motor and to a tweeter. The filters may be any one of a high pass filter for substantially passing only the higher frequency components to the conventional loudspeaker functioning as a tweeter, a cross-over network which couples amplified audio communications respectively to the vibration motor and to the tweeter. Finally, individual low and high pass filters may be utilized to divide the audio communications into separate channels which contain amplifiers for respectively coupling higher frequency components to a tweeter with a relatively lower amplification gain and coupling the lower frequency components to the vibration motor with a relatively higher amplification gain. The relatively higher amplification level used for the lower frequency components is desirable when the motor operates with a lower efficiency than to reproduce the audio communications as audible sound than a conventional loudspeaker which may operate at a higher efficiency to reproduce sound which therefore requires a lower amplification gain.

Preferably, the vibration motor is part of a base plane which preferably is the external case of the mobile terminal so as to accentuate the level of the lower frequency components within the audio communications which are reproduced as audible sound to the user of the mobile terminal.

The invention is a mobile terminal which includes a vibration motor which provides a silent vibration alert to a user of the mobile terminal during reception of incoming communications which include audio communications; and an amplifier, the amplifier amplifying the audio communications and producing an amplified audio output coupled to at least the vibration motor which outputs the audio communications as audible sound. A loudspeaker may be coupled to the amplifier and output the audio communications as audible sound whereby the amplified audio signal causes the vibration motor and the loudspeaker to reproduce the audio communications as audible sound. A high pass filter may be coupled to the amplifier and the loudspeaker and pass substantially non-attenuated higher frequency components of the audio communications and substantially attenuate lower frequency components of the audio communications. The high pass filter may provide an output which is coupled as an input to the amplifier. The loudspeaker may be a tweeter. The high pass filter may be a capacitor or within a cross-over network and couple an output of the amplifier to the loudspeaker which may be a tweeter. A low pass filter may be coupled to the amplifier and the vibration motor, which passes substantially non-attenuated lower frequency components of the audio communications and substantially attenuate higher frequency components of the audio communications. A low pass filter within the cross-over network may couple substantially non-attenuated lower frequency components of the audio communications amplified by the amplifier to the vibration motor. A high pass filter having an input may receive the audio communications and an output may be coupled to an input of a first amplifier having an output coupled to a tweeter; a low pass filter having an input may receive the audio communications and an output may be coupled to an input of a second amplifier having an output coupled to the vibration motor; and wherein an amplification gain of the second amplifier may be greater than an amplification gain of the first amplifier. A base plane may be coupled to the vibration motor, and also output the audible sound.

The invention is also a method of receiving audio communications with a mobile terminal having a vibration motor which provides a silent alert to a user of the mobile terminal during reception of incoming communications which include audio communications including detecting incoming audio communications with the mobile terminal; amplifying the detected audio communications with an amplifier in the mobile terminal; and coupling the amplified audio communications to the vibration motor which outputs the audio communications as audible sound. The amplified audio communications may be coupled to the loudspeaker whereby the amplified audio communications may also be reproduced by the loudspeaker as audible sound. The audio communications may have higher and lower frequency components and the lower frequency components may be produced substantially as audible sound by the vibration motor and the higher frequency components may be produced substantially by the loudspeaker.

BRIEF DESCRIPTION OF THE DRAWINGS

FIG. 1 illustrates a mobile terminal of the Assignee in accordance with the prior art.

FIG. 2 is a sectional view of a vibration motor within the mobile terminal of FIG. 1.

Like reference numerals identify like parts throughout the drawings.

DESCRIPTION OF THE PREFERRED EMBODIMENTS

The present invention is an improved mobile terminal and method of use thereof which uses a conventional vibration motor, such as that described in the above-referenced patents and applications, to perform the additional function of reproducing audio communications received by the user of the mobile terminal. The use of the vibration motor, such as the prior art of FIGS. 1 and 2, either eliminates altogether the requirement for a separate loudspeaker or enhances the reproduction of lower frequency components of the received audio communications which permits the loudspeaker to function as a tweeter to reproduce only the higher frequency components of the received audio communications to produce an overall better reproduction of the received audio communication.

Figure 3:
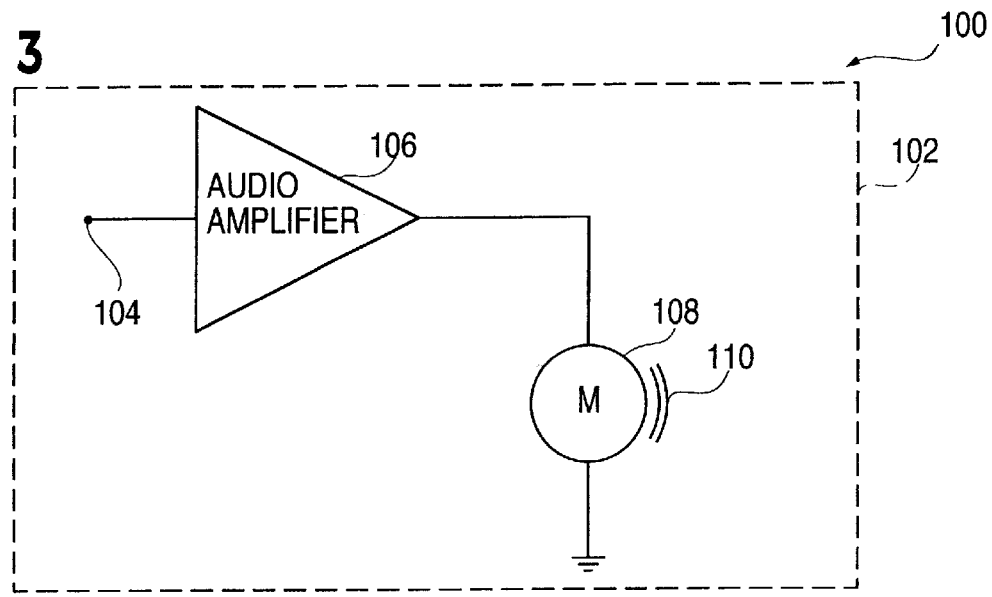
FIG. 3 illustrates a first embodiment of the present invention.

FIG. 3 illustrates a first embodiment 100 of a mobile terminal in accordance with the present invention. The dotted box 102 signifies that all of the well-known components of a conventional mobile terminal are present which in themselves do not form part of the present invention. The demodulated output signal, in the form of audio communications, is applied to input 104 of an audio amplifier 106 which amplifies the audio communications inputted to a sufficient signal level to drive vibration motor 108 to reproduce audible sound 110. The construction of the vibration motor 108 may be in accordance with the prior art including, but not limited to, the vibration motor described above in conjunction with the prior art of FIGS. 1 and 2. Additionally, the vibration motor 108 is utilized to perform its conventional function of producing a silent vibration alert when programmed to do so by the user of the mobile terminal 102 in response to incoming calls or messages. The level of gain of the audio amplifier 106 is chosen to provide the required output level of sound 110. Furthermore, the audio amplifier 106 may utilize amplification which is not linear as a function of frequency so as to produce audio communications 110 of an acceptable tone which naturally reproduces the sound of the caller.

Figure 4:
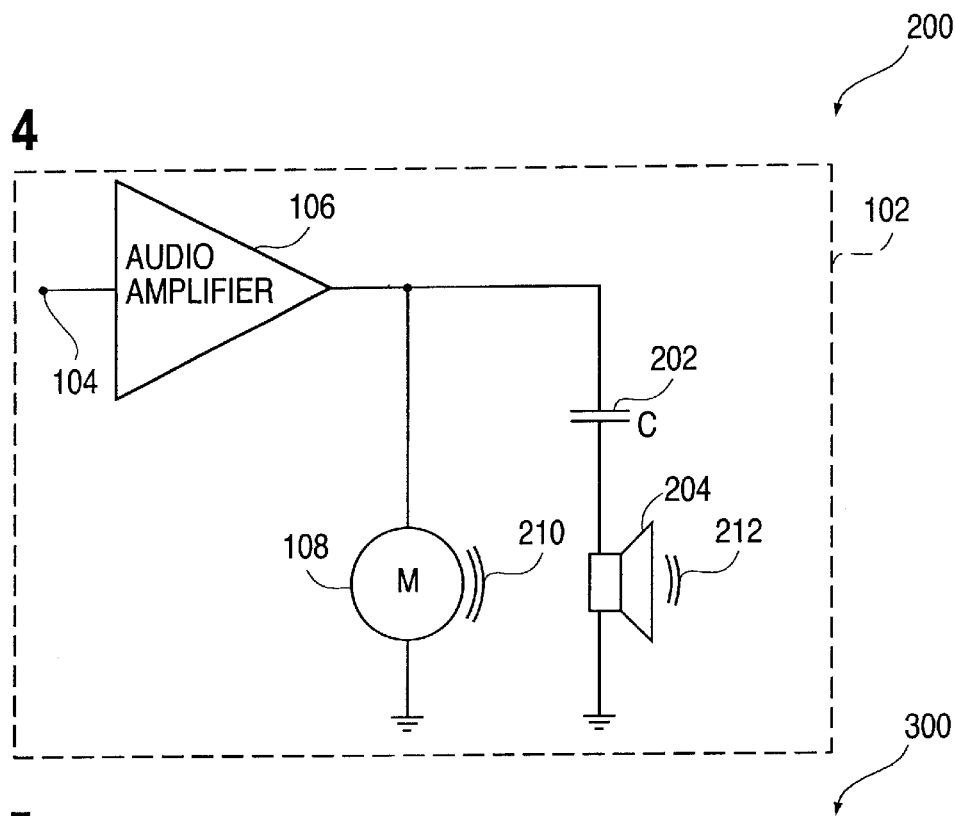
FIG. 4 illustrates a second embodiment of the present invention.

FIG. 4 illustrates a second embodiment 200 which differs from the first embodiment in that the vibration motor 108 is only used to reproduce lower frequency components of the demodulated audio communications inputted at point 104 of the audio amplifier 106. Capacitor 202 functions as a high pass filter which substantially passes the higher frequency components of the audio communications and substantially attenuates the lower frequency components so that the lower frequency components are only reproduced by the vibration motor 108. The higher frequency components, which are not substantially attenuated by the capacitor 202, are applied to loudspeaker 204 which functions as a tweeter to reproduce the higher frequency components 212 of the audio communications.

Figure 5:
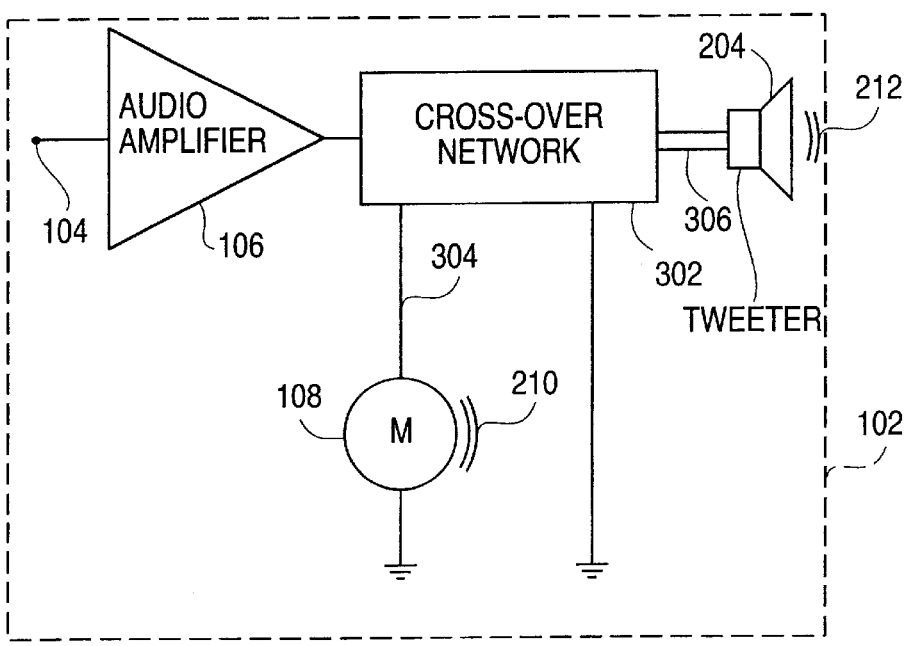
FIG. 5 illustrates a third embodiment of the present invention.

FIG. 5 illustrates a third embodiment 300 of the present invention. The third embodiment 300 utilizes a passive or active cross-over network 302 of any known design which selectively splits the output signal from the audio amplifier 106 into two channels 304 and 306 which respectively contain the lower frequency components and the higher frequency components of the demodulated audio communications outputted by the audio amplifier 106. The frequency point of cross over at which the composite amplified audio communications produced by amplifier 106 are split into the channels 304 and 306 may be varied in accordance with the characteristics of the vibration motor 108 and tweeter 204 in respectively reproducing the lower frequency and higher frequency components of the audio communications.

Figure 6:
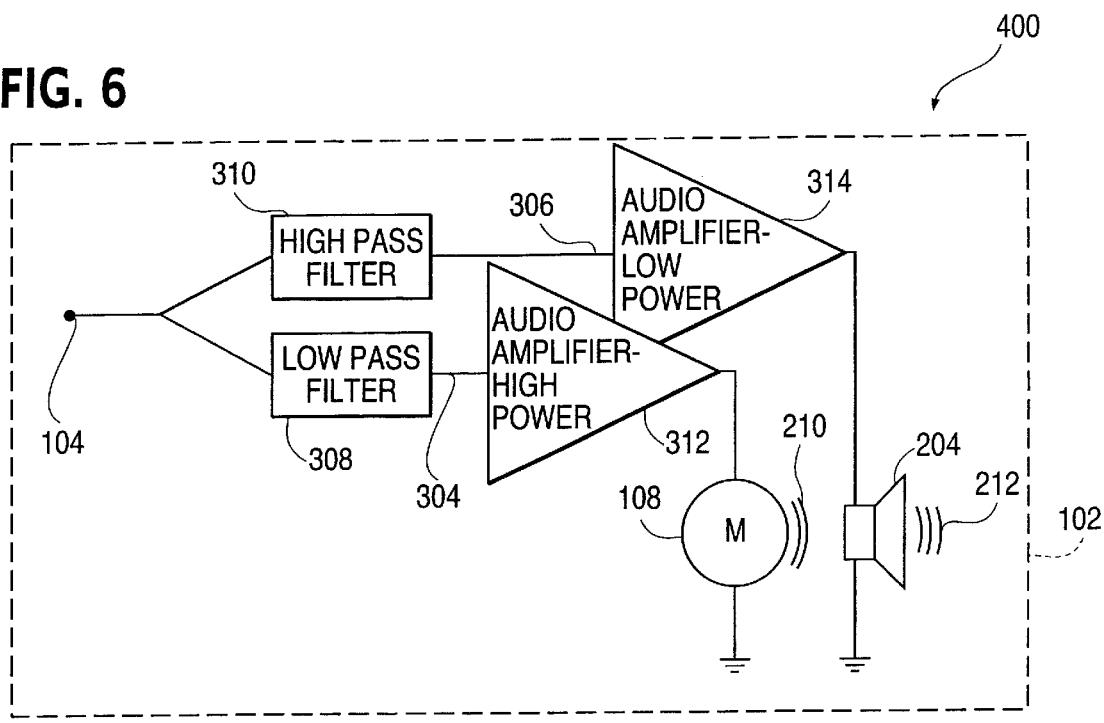
FIG. 6 illustrates a fourth embodiment of the present invention.

FIG. 6 illustrates a fourth embodiment 400 in accordance with the present invention. The fourth embodiment 400 splits the demodulated audio communications, which are inputted at point 104, into two channels 304 and 306 by using of a low pass filter 308 and a high pass filter 310 each of conventional design. The passband of the filters 308 and 310 may be chosen to change the sound quality of the audio communications which is reproduced. The output of the low pass filter 308, which passes the lower frequency components in a substantially non-attenuated manner and substantially attenuates the higher frequency components is an input to audio amplifier 312 having a relatively high gain for driving the vibration motor 108 with sufficient input power to produce an acceptable output of audible sound 210 which reproduces the lower frequency components present in the audio communications. The output of high pass filter 310 is an input to audio amplifier 314 having a relatively lower gain than the gain of the audio amplifier 312 as a result of the higher efficiency of tweeter 204 in reproducing the higher frequency audible sound 212.

Figure 7:
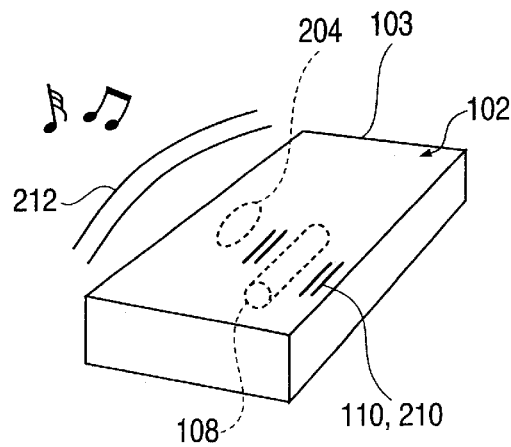
FIG. 7 illustrates the vibration motor of the present invention as mounted in the case of a mobile terminal and which case functions as a base plane to enhance production of sound.

FIG. 7 illustrates a preferred mounting arrangement of the vibration motor 108 of the embodiments of the present invention in the exterior case 103 of the terminal device 102. Depending on which embodiment of the invention is being used, the vibration motor 108 mounted to the exterior case 103 either reproduces the entire frequency spectrum 110 of the audio communications or the lower frequency components 210 of the audio communications. Higher frequency components 212 of the audio communications may be reproduced separately by tweeter 204.

With reference to FIGS. 3-6, a method of receiving audio communications with a mobile terminal during reception of incoming communications, which include audio communications, is described as follows. The detected audio communications are provided by input 104 to one of the audio amplifiers 106 or 312 which amplifies the audio communications. The amplified communications are coupled to the vibration motor 108. The vibration motor 108 outputs the audio communications as audible sound 110 or 210. The amplified audio communications, as amplified by audio amplifier 106 or 314, are also coupled to loudspeaker 204 which functions as a tweeter to output higher frequency components of the audio communications as audible sound 212 while lower frequency components 210 of the audio communications are outputted as audible sound by the vibration motor 108.

While the present invention has been described in terms of its preferred embodiments, it should be understood that numerous modifications may be made thereto without departing from the spirit and scope of the present invention. It is intended that all such modifications fall within the scope of the appended claims.

What is claimed is:

1. A mobile terminal comprising:
   a vibration motor comprising an imbalanced rotor which rotates about an axis to provides a silent vibration alert to a user of the mobile terminal during reception of incoming communications which include audio communications; and
   an amplifier, the amplifier amplifying the audio communications and producing an amplified audio output coupled to at least the vibration motor which outputs the audio communication as audible sound.

2. A mobile terminal in accordance with claim 1 comprising:
   a loudspeaker, coupled to the amplifier, which outputs the audio communications as audible sound whereby the amplified audio signal causes the vibration motor and the loudspeaker to reproduce the audio communications as audible sound.

3. A mobile terminal in accordance with claim 2 comprising:
   a high pass filter, coupled to the amplifier and the loudspeaker, which passes substantially non-attenuated higher frequency components of the audio communications and substantially attenuates lower frequency components of the audio communications.

4. A mobile terminal in accordance with claim 3 wherein:
   the high pass filter provides an output which is coupled as an input to the amplifier.

5. A mobile terminal in accordance with claim 3 wherein:
   the loudspeaker is a tweeter.

6. A mobile terminal in accordance with claim 4 wherein:
   the loudspeaker is a tweeter.

7. A mobile terminal in accordance with claim 3 wherein:
   the high pass filter is a capacitor.

8. A mobile terminal in accordance with claim 5 wherein:
   the high pass filter is a capacitor.

9. A mobile terminal in accordance with claim 3 wherein:
   the high pass filter is within a cross-over network and couples an output of the amplifier to the loudspeaker.

10. A mobile terminal in accordance with claim 5 wherein:
    the high pass filter is within a cross-over network and couples an output of the amplifier to the tweeter.

11. A mobile terminal in accordance with claim 1 comprising:
    a low pass filter, coupled to the amplifier and the vibration motor, which passes substantially non-attenuated lower frequency components of the audio communications and substantially attenuates higher frequency components of the audio communications.

12. A mobile terminal in accordance with claim 2 comprising:
    a low pass filter, coupled to the amplifier and the vibration motor, which passes substantially non-attenuated lower frequency components of the audio communications and substantially attenuates higher frequency components of the audio communications.

13. A mobile terminal in accordance with claim 3 comprising:
    a low pass filter, coupled to the amplifier and the vibration motor, which passes substantially non-attenuated lower frequency components of the audio communications and substantially attenuates higher frequency components of the audio communications.

14. A mobile terminal in accordance with claim 4 comprising:

a low pass filter, coupled to the amplifier and the vibration motor, which passes substantially non-attenuated lower frequency components of the audio communications and substantially attenuates higher frequency components of the audio communications.

15. A mobile terminal in accordance with claim 5 comprising:
   a low pass filter, coupled to the amplifier and the vibration motor, which passes substantially non-attenuated lower frequency components of the audio communications and substantially attenuates higher frequency components of the audio communications.

16. A mobile terminal in accordance with claim 9 comprising:
   a low pass filter within the cross-over network which couples substantially non-attenuated lower frequency components of the audio communications amplified by the amplifier to the vibration motor.

17. A mobile terminal in accordance with claim 1 comprising:
   a high pass filter having an input which receives the audio communications and an output coupled to an input of a first amplifier having an output coupled to a tweeter;
   a low pass filter having an input which receives the audio communications and an output coupled to an input of a second amplifier having an output coupled to the vibration motor; and wherein
   an amplification gain of the second amplifier is greater than an amplification gain of the first amplifier.

18. A mobile terminal in accordance with any one of claims 1–17 further comprising:
   a base plane, coupled to the vibration motor, which also outputs the audible sound.

19. A mobile terminal in accordance with claim 18 wherein:
   the base plane is a part of an external cover of the mobile terminal.

20. A method of receiving audio communications with a mobile terminal having a vibration motor comprising an imbalanced rotor which rotates about an axis to provides a silent alert to a user of the mobile terminal during reception of incoming communications which include audio communications comprising:
   detecting incoming audio communications with the mobile terminal;
   amplifying the detected audio communications with an amplifier in the mobile terminal; and
   coupling the amplified audio communications to the vibration motor which outputs the audio communications as audible sound.

21. A method in accordance with claim 20 wherein the mobile terminal includes a loudspeaker comprising:
   coupling the amplified audio communications to the loudspeaker whereby the amplified audio communications are also reproduced by the loudspeaker as audible sound.

22. A method in accordance with claim 21 wherein:
   the audio communications have higher and lower frequency components and the lower frequency components are produced substantially as audible sound by the vibration motor and the higher frequency components are produced substantially by the loudspeaker.

* * * * *